United States Patent

Elliot et al.

[15] 3,641,397

[45] Feb. 8, 1972

[54] OFF-DELAY SOLID-STATE TIMER SYSTEMS

[72] Inventors: William H. Elliot, Whitefish Bay; Isadore Small, III, Milwaukee, both of Wis.

[73] Assignee: Cutler-Hammer, Inc., Milwaukee, Wis.

[22] Filed: Apr. 8, 1970

[21] Appl. No.: 26,527

[52] U.S. Cl. ....................317/141 S, 317/148.5 B, 307/252, 307/293

[51] Int. Cl. ....................H01h 47/32, H01h 47/18

[58] Field of Search ....................317/141 S, 142; 307/293

[56] References Cited

UNITED STATES PATENTS

| | | | |
|---|---|---|---|
| 3,334,243 | 8/1967 | Cooper | 317/141 S |
| 3,401,312 | 9/1968 | Eckl | 317/142 |
| 3,436,607 | 4/1969 | Yagusic | 317/142 |
| 3,457,433 | 7/1969 | Watson | 307/141 |

*Primary Examiner*—L. T. Hix

*Attorney*—Hugh R. Rather

[57] ABSTRACT

AC and DC solid-state timers for controlling loads such as electromagnetic relays or the like. The timer is supplied through a rectifier from the AC source and provides a time delay after opening of the control circuit; that is, when the control switch is moved to "off" position, the timer delays drop out of the relay for a predetermined, adjustable time interval. The timing can be cancelled at any time before relay dropout by moving the control switch back to "on" position and this will not affect relay energization. A second version works equally well on AC or DC power. A third version returns the load to the condition it was in before power failure when the power comes back on.

13 Claims, 3 Drawing Figures

Inventors
William H. Elliot
Isadore Small III
By Wm. A. Autio
Attorney

Inventors
William H. Elliot
Isadore Small III
By Wm. A. Autio
Attorney

OFF-DELAY SOLID-STATE TIMER SYSTEMS

BACKGROUND OF THE INVENTION

Solid-state timers have been known heretofore including both on-delay and off-delay types. A common type uses an RC network for the time delay circuit. In this network, a current charges the capacitor at a rate determined by a resistor. This resistor is variable so that the time interval can be adjusted. The end of the time interval is determined by a trigger device that usually is a unijunction transistor. This trigger device gates a power switch such as an SCR.

While these prior solid-state timers have been useful for their intended purposes, this invention relates to improvements thereon.

SUMMARY OF THE INVENTION

This invention relates to off-delay solid-state timer systems that have a number of advantages over prior timers.

An object of the invention is to provide an improved solid state timer system for timing deenergization of an electrical load device.

A more specific object of the invention is to provide an improved solid-state timing system that allows cancellation of the timing function without affecting load energization.

A more specific object of the invention is to provide an improved solid-state timer system having means preventing inadvertent time out and providing a positive reset thereof.

Another specific object of the invention is to provide an improved solid-state timer system having a control thyristor and means preventing a transient from rendering it conducting inadvertently.

Another specific object of the invention is to provide an improved solid-state timer system having means for resetting the timing circuit thereof instantly at the end of the time period and for preventing it from recycling.

Another specific object of the invention is to provide an improved solid-state timer system supplied through rectifier means from the same source as the load that it controls is supplied and having a single-pole single throw switch for controlling a timer circuit comprising a programmable unijunction transistor timing bridge, a control SCR and a power switching device.

Another specific object of the invention is to provide an improved solid-state timer system that returns the load to the condition it was in before power failure when the power comes back on.

A further object of the invention is to provide an improved solid-state timer system having a minimum number of parts for achieving improved results.

Other objects and advantages of the invention will hereinafter appear.

BRIEF DESCRIPTION OF THE DRAWING

FIG. 3 shows an AC off-delay solid-state timer system that will return the load to the condition it was in before power failure when the power comes back on.

DESCRIPTION OF THE PREFERRED EMBODIMENT

Figure 1:
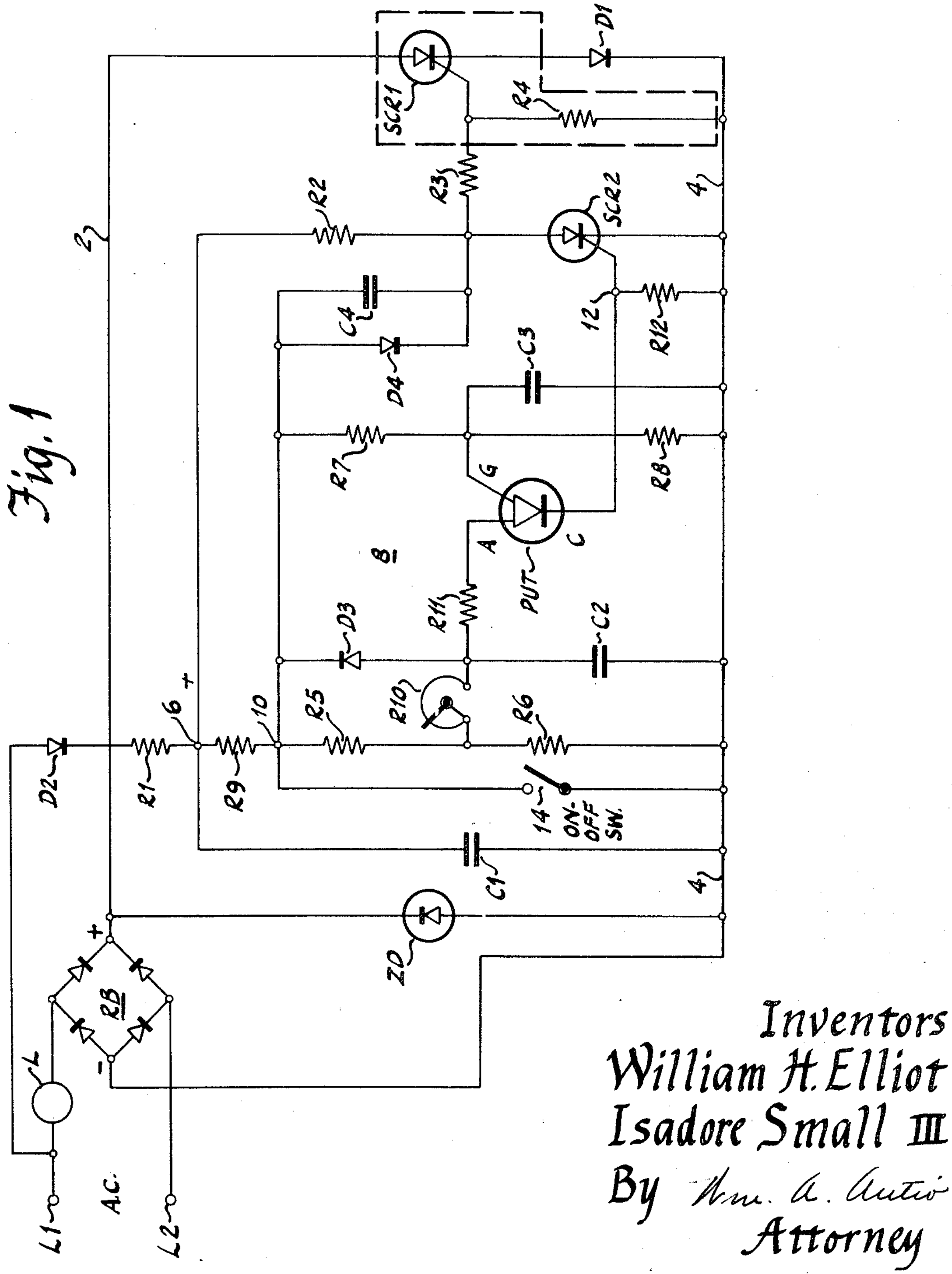
FIG. 1 shows an AC off-delay solid-state timer system constructed in accordance with the invention.

Referring to FIG. 1 of the drawing, there is shown an alternating current load L connected in series with a power-switching device SCR1 such as a semiconductor controlled rectifier (SCR) across power lines L1 and L2 of an alternating current source, there being a rectifier bridge RB between the load and power SCR to provide direct current for the latter. For exemplary purposes, the source may be 120 volts AC and the load may be an electromagnetic relay such as a reed relay or the like.

For this purpose, line L1 is connected through load L to one input terminal of bridge RB and line L2 is connected directly to the other input terminal of the bridge so that the load is on the AC side of the rectifier bridge. The positive output terminal of the rectifier bridge is connected through conductor 2, the anode and cathode of SCR1, diode D1 in the forward low impedance direction and conductor 4 to the negative output terminal of the bridge.

Diode D1 is used to reduce the leakage current through the load when it is turned off as hereinafter described.

A zener diode ZD is connected across conductors 2 and 4 to provide a discharge path for line transients in shunt of SCR1 to protect the latter therefrom.

There is also provided means for firing power SCR1 into conduction to energize the load and a DC supply for this firing control means.

This DC supply comprises a connection from line L1 through a rectifier diode D2 in its forward low impedance direction and a resistor R1 to junction 6 that is connected through a filter capacitor C1 to negative conductor 4. This circuit provides half-wave rectified voltage that is smoothed by capacitor C1 to afford a filtered supply of DC at junction 6 for control purposes.

The aforesaid firing means for the power SCR comprises a connection from junction 6 through resistors R2 and R3 to the gate of SCR1. A resistor R4 is connected from the gate of SCR1 to negative conductor 4 to increase the power SCR1 circuit stability.

There is also provided a timing circuit and static means operated by the timing circuit for shunting the gate-cathode circuit of the power SCR to turn it off at the end of the timed interval and for clamping the timing circuit to prevent recycling thereof.

This timing circuit comprises a programmable unijunction transistor timing bridge 8. This timing bridge comprises a first pair of resistors R5 and R6 connected in series from junction 10 to negative conductor 4. A second pair of resistors R7 and R8 are connected in series from junction 10 to conductor 4. Junction 10 is supplied with DC from DC supply junction 6 through a voltage dropping resistor R9. The junction between the first pair of resistors is connected through an RC timing circuit comprising a variable time setting resistor R10 and a timing capacitor C2 to negative conductor 4. The junction between resistor R10 and capacitor C2 is connected through a resistor R11 to anode A of a programmable unijunction transistor PUT. The junction between the second pair of bridge resistors is connected to the gate G of the PUT. The cathode C of the PUT is connected to output terminal 12 of the timing bridge.

Also, in the timing bridge, a diode D3 is connected in its forward low impedance direction from the upper, positive side of timing capacitor C2 to junction 10 to form a quick-discharge path for the timing capacitor through the on-off switch if the timing function is interrupted or cancelled.

A control capacitor C3 is connected from the gate of the PUT to negative conductor 4 to prevent an inadvertent output from the timing bridge when the timing function is intentionally interrupted.

The aforesaid means operated by the timing circuit for shunting the gate-cathode of power SCR1 comprises a control SCR2. The junction of resistors R2 and R3 is connected through the anode and cathode of this control SCR2 to negative conductor 4. Output terminal 12 of the timing bridge is connected to the gate of this control SCR2. The gate thereof is also connected through a resistor R12 to negative conductor 4 to increase the stability of control SCR2. For clamping the timing circuit to prevent recycling thereof, a diode D4 is connected in its forward low impedance direction from junction 10 to the anode of control SCR2 to prevent continuous recycling of the timing circuit after the load has been deenergized. A capacitor C4 is connected across diode D4 to assist in turning control SCR2 off when required.

The system is also provided with means for turning the load on and off, for resetting the timing circuit and for its control purposes, and to discharge the timing capacitor through diode D3. This means comprises an on-off switch 14 connected across the PUT timing bridge from junction 10 to negative conductor 4.

OPERATION OF FIG. 1

When power is initially applied to lines L1 and L2, the load will become energized whether switch 14 is open or closed. In either case, current will flow from junction 6 through resistors R2 and R3 into the gate of power SCR1 to fire it into conduction and to energize the load. If switch 14 is closed, the load will remain energized. If switch 14 is open, the load will energize as aforesaid but the timing circuit will operate to deenergize the load as hereinafter described.

Thereafter, the load will be energized whenever the DC terminals of the rectifier bridge are connected together through a low impedance. This is done by closing switch 14. This switch shunts the PUT timing bridge. Consequently, current will flow from DC supply junction 6 through resistors R2 and R3 to the gate of SCR1 to fire this power SCR1 into conduction at the beginning of each rectified half-cycle of the source. This will cause AC current to flow through the load and full-wave rectified current to flow from the rectifier bridge through power SCR1 and diode D1. As a result, the load will be energized.

During the time that the load is energized, diode D4 prevents switch 14 from bypassing the gate current that fires power SCR1.

The load will be deenergized at a time interval after the on-off switch is reopened. Upon opening the switch, timing capacitor C2 starts charging by current flow from DC junction 6 through resistors R9, R5 and R10 thereinto. The filtered DC voltage at junction 6 maintains gate G of the PUT at a predetermined voltage level and control capacitor C3 becomes charged to this level. As timing capacitor C2 charges, the increasing voltage at its upper side is applied through resistor R11 to the anode of the PUT.

At the end of the time delay when the potential at the anode of the PUT reaches approximately that at which its gate is held constant, the anode-cathode circuit thereof drops to a low impedance. This causes it to discharge timing capacitor C2 into the gate of control SCR2, rendering the latter conducting. When this discharge pulse of current ends, control SCR2 remains conducting due to the fact that its anode is supplied with smoothed DC current from junction 6. As a result, control SCR2 shunts the gate current from power SCR1 so that the latter stops conducting at the end of the rectified half-cycle. Diode D1 assists turnoff of power SCR1 by biasing its cathode above the level of negative conductor 4 by an amount equal to the potential drop thereacross. This causes deenergization of the load.

When the timing capacitor discharged as aforesaid, the potential at the anode of the PUT decreased causing the latter to be restored to its nonconducting condition. This would allow the timing capacitor to start recharging with consequent recycling of the timing circuit were it not prevented. For this purpose, conduction of control SCR2 operates through diode D4 to clamp junction 10 of the PUT timing bridge to a low voltage, equal to the voltage drops across the diode and control SCR2. This prevents the timing capacitor from recharging and the timing circuit from recycling.

In the event it is desired to cancel the deenergization of the load before the timing circuit has timed out, this can be done by reclosing the on-off switch. As a result, the timing capacitor discharges fast through diode D3 and the on-off switch to decrease the voltage on the anode of the PUT. This closure of the on-off switch also would drop the voltage on the gate of the PUT which might cause the latter to be rendered conducting were it not for control capacitor C3. It is important not to render the PUT conducting since this would cause deenergization of the load. Control capacitor C3, by delaying decrease in the gate voltage, maintains this gate voltage higher than the anode voltage to insure that the PUT is not rendered conducting as timing capacitor C2 discharges through diode D3 and the on-off switch. Control capacitor C3 discharges through resistor R8 at a slower rate. Thus, the load remains energized and the timing function has been cancelled.

After the load has been deenergized with time delay as hereinbefore described, it can be reenergized by merely reclosing the on-off switch. This causes control SCR2 to be rendered nonconducting and power SCR1 to be rendered conducting to energize the load. For this purpose, it may be observed that before the on-off switch was closed, capacitor C4 was charged to a voltage equal to the potential drop on diode D4. This came about by current flow from junction 10 through capacitor C4 in parallel with diode D4 and then through control SCR2 to negative conductor 4. At this same time, current also flowed from junction 6 through resistor R2 and control SCR2 whereby the latter shunted the gate of power SCR2 to keep it turned off.

This charge on capacitor C4 now acts to turn control SCR2 off when the on-off switch is closed. This capacitor voltage is applied through the on-off switch to apply a small reverse voltage bias on the anode-cathode circuit of control SCR2 to render it nonconducting. This reverse bias is necessary because control SCR2 is supplied with DC. This shunting of the timing circuit by the on-off switch provides positive resetting of the circuit and prevents it from timing out inadvertently. Also, this shunting of control SCR2 through capacitor C4 and the on-off switch prevents transients from causing it to conduct inadvertently.

When the control SCR2 is rendered nonconducting as aforesaid, current will flow from junction 6 through resistors R2 and R3 to the gate of power SCR2 to fire it into conduction at the beginning of each rectified half-cycle of the source.

Figure 2:
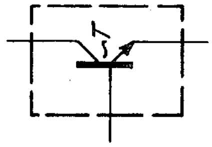
FIG. 2 shows a modification whereby the system of FIG. 1 will operate on either AC or DC power.

FIG. 2 shows a power transistor T that can be substituted for the broken line enclosed portion of the circuit in FIG. 1, including power SCR1 and resistor R4, to allow operation of the system from either AC or DC power. When this power transistor is used, resistor R4 is not needed.

While power SCR1 of FIG. 1 requires dropping of its anode current to or near zero in order to turn it off, thereby limiting its use to AC power, the power transistor can be turned off by its base voltage control. Consequently, this power transistor enables use of the system with AC or DC power. For this purpose, when control SCR2 is rendered conducting, following opening of the on-off switch as hereinbefore described, the base of the power transistor is brought to substantially the same voltage or less than its emitter voltage to bias it off thereby deenergizing the load. On the other hand, when the on-off switch is closed, control SCR2 will be turned off as hereinbefore described and positive voltage will be applied from junction 6 through resistors R2 and R3 to the base of the power transistor to turn it on. This causes energization of the load.

Under these conditions, if AC power is used, the power transistor will conduct for each rectified half-cycle. If DC power is used, the power transistor will conduct continuously.

Figure 3:
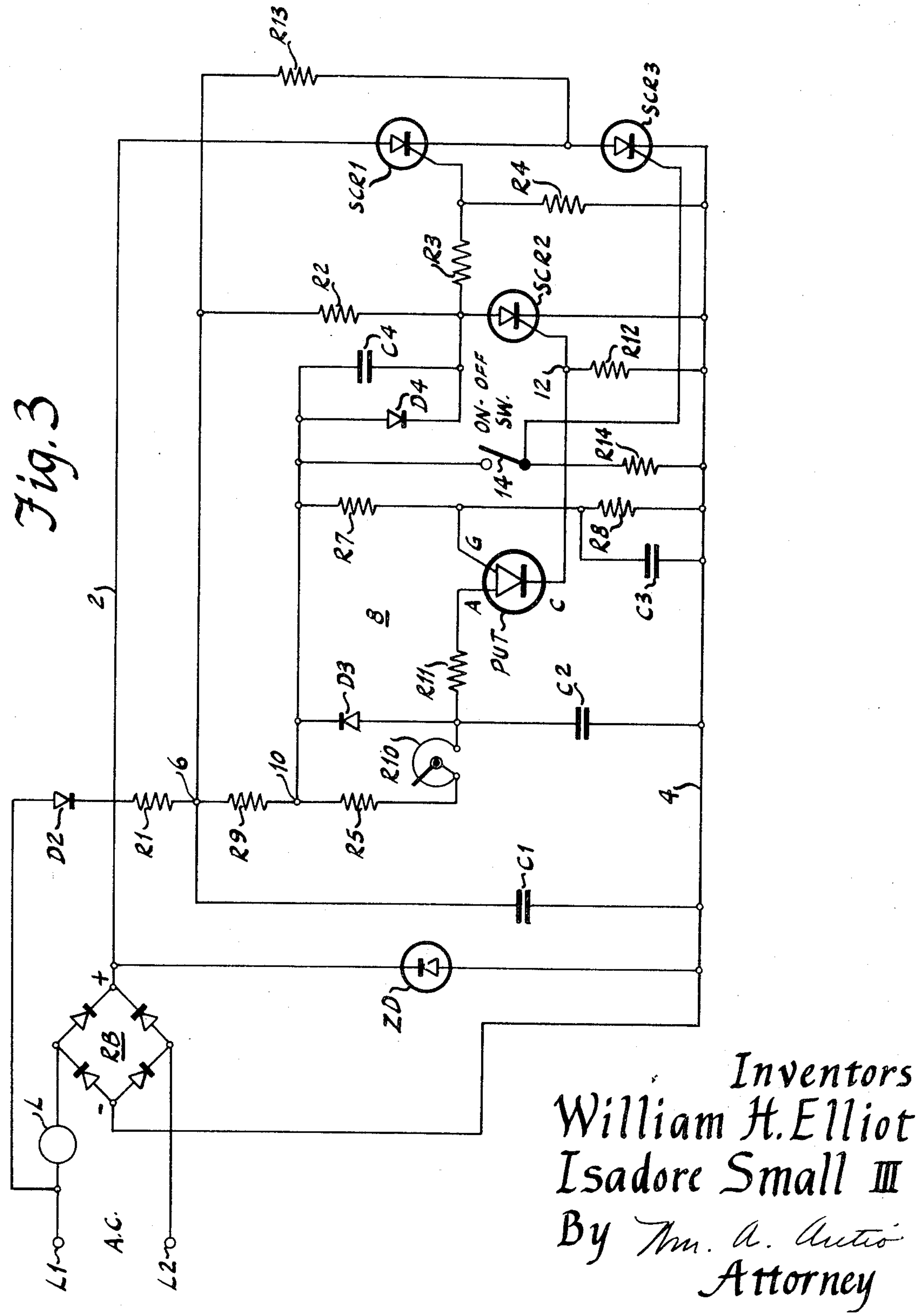

FIG. 3 shows an AC off-delay solid-state timer system that will restore to its previous condition following power failure when the power comes back on. That is, if the load was energized when the power failed, the load will reenergize when the power comes back on. On the other hand, if the load was deenergized when the power failed, the load will not be energized when the power comes back on. The only exception is if the system is in the process of timing. Under such condition, the load will be energized when the power fails but will remain deenergized when the power comes back on. This is because the timing was for the purpose of timed deenergization of the load.

In FIG. 3 reference characters like those in FIG. 1 have been given for like elements.

The system in FIG. 3 is like the system in FIG. 1 except for the following differences. A second power SCR3 has been put in place of diode D1 and a resistor R13 is connected from DC supply junction 6 to the anode of SCR3 to supply anode current thereto. On-off switch 14 is connected from junction 10 through the gate-cathode circuit of SCR3 to negative conductor 4 and a stabilizing resistor R14 is connected from the gate of SCR3 to conductor 4.

Another difference is that resistor R6 of FIG. 1 has been omitted in FIG. 3. However, this change merely has the effect of raising the voltage level to which capacitor C2 is to be charged and affords a more linear charging function.

OPERATION OF FIG. 3

The load will be quickly energized when the on-off switch is closed and will be deenergized with a time delay when the on-off switch is opened.

Upon closure of switch 14, current will flow from junction 6 through resistors R2 and R3 to the gate of power SCR1 to fire the latter into conduction at the beginning of each rectified half-cycle of its anode current as in FIG. 1. Current will also flow from junction 10 through switch 14 to the gate of power SCR3 to fire the latter into conduction. This will cause AC current to flow through the load and full-wave rectified current to flow from the rectifier bridge through power SCR1 and power SCR3. For this purpose, on each half-cycle, current flows from the positive output terminal of the rectifier bridge through conductor 2, SCR1 and SCR3 and conductor 4 to the negative output terminal of the rectifier bridge. Smoothed current also flows from junction 6 through resistor R13 and SCR3 to conductor 4.

If the power should fail while the load is energized, the load will reenergize when the power comes back on. During this time since on-off switch 14 will remain closed, gate current for SCR1 and SCR3 will be applied in the same manner hereinbefore described. Since SCR1 and SCR3 also have anode current applied thereto, both SCR1 and SCR3 will be fired into conduction to reenergize the load.

To deenergize the load with time delay, the on-off switch is opened. This removes the gate current from SCR3. However SCR3 remains conducting due to the filtered anode current applied thereto from junction 6 through resistor R13.

This opening of the on-Off switch allows the timing circuit to start operating. Current flows from junction 6 through resistors R9 and R5 and adjustable resistor R10 into capacitor C2. When the voltage on the upper side of timing capacitor C2 causes the anode voltage of PUT to reach the level of the gate voltage thereof, the anode-cathode circuit of the PUT drops to a low impedance. Consequently, the PUT discharges the timing capacitor into the gate of control SCR2 to fire the latter into conduction. This control SCR2 shunts the gate circuit of power SCR1 so that the latter stops conducting at the end of the rectified half-cycle of current applied to its anode. This causes deenergization of the load.

If the power should fail while the load is deenergized and then come back on, the load will remain deenergized. It will be recalled that SCR1 was rendered nonconducting to deenergize the load. This was done by the timing circuit rendering SCR2 conducting. SCR3 was previously maintained conducting by anode voltage from junction 6. Now when power fails, SCR2 and SCR3 are rendered nonconducting. When power comes back on, SCR1 is fired into conduction by gate current coming from junction 6 through resistors R2 and R3 because SCR2 is not conducting. However, this will not energize the load because SCR3 remains nonconducting. This SCR3 is held in its nonconducting state because its gate circuit is open at on-off switch 14.

In other respects the circuit of FIG. 3 operates as hereinbefore described in connection with the system of FIG. 1.

While the systems hereinbefore described are effectively adapted to fulfill the objects stated, it is to be understood that the invention is not intended to be confined to the particular preferred embodiments of off-delay solid-state timer systems disclosed, inasmuch as they are susceptible of various modifications without unduly departing from the scope of the appended claims.

We claim:

1. In an off-delay solid-state timer system, the combination comprising:

an electric power source;

a load adapted to be energized from said source;

solid-state means connected in circuit with said source and said load and comprising semiconductor switching means for controlling energization and deenergization of said load;

an on-off switch;

means operable by said on-off switch for controlling said semiconductor switching means thereby to energize said load;

timing means supplied from said source and operable by said on-off switch for controlling deenergization of said load a predetermined time interval after off-actuation of said switch;

said timing means comprising an RC timing circuit and a programmable unijunction transistor responsive to said RC timing circuit at the end of a predetermined time interval for providing a control signal;

static means responsive to said control signal for controlling deenergization of said load and for clamping said timing means to prevent recycling thereof;

and means in said timing means affording cancellation of the timing function without affecting load energization.

2. The invention as defined in claim 1, wherein said on-off switch is connected across said timing means to provide positive resetting of the system upon closure thereof and to prevent inadvertent timeout thereof.

3. The invention defined in claim 1, wherein said timing means comprises:

a resistance network supplied from said source for providing gate voltage to said programmable unijunction transistor;

means connecting said RC timing circuit to said network and to the anode of said programmable unijunction transistor;

and means connecting the cathode of said programmable unijunction transistor to said static means.

4. The invention defined in claim 1, wherein said static means comprises:

a triode thyristor responsive to said control signal for rendering said semiconductor switching means nonconducting thereby to deenergize said load;

and means operable when said triode thyristor is rendered conducting for clamping said timing means to prevent reoperation of the RC timing circuit therein.

5. The invention defined in claim 4, wherein said clamping means comprises:

a unidirectional diode connected in series with said triode thyristor across said timing means.

6. The invention defined in claim 5, wherein:

said electric power source is an alternating current source;

and said static means comprises means connected to said alternating current source for providing a filtered DC supply for said triode thyristor to reduce the likelihood of false operation thereof.

7. The invention defined in claim 5, wherein said means operable by said on-off switch for controlling said semiconductor switching means thereby to energize said load comprises:

means responsive to closure of said on-off switch for applying a reverse voltage on said triode thyristor for rendering it nonconducting thereby to enable operation of said semiconductor switching means to energize the load.

8. The invention defined in claim 7, wherein said means responsive to closure of said on-off switch for applying a reverse voltage comprises:

a commutating capacitor connected across said unidirectional diode and being operable to charge when said triode thyristor is conducting;

and said on-off switch upon closure connecting said commutating capacitor across said triode thyristor to turn the latter off, said commutating capacitor thereafter preventing transients from rendering said triode thyristor conducting while said on-off switch is closed.

9. The invention defined in claim 1, wherein said means affording cancellation of a timing operation comprising:

a unidirectional diode connected in series with said on-off switch across the capacitor of said RC circuit to afford fast discharge of the capacitor when the on-off switch is closed;

and a control capacitor connected across one branch of said resistance network for delaying the rate of voltage decrease on the gate of said programmable unijunction transistor thereby to insure that the latter will not be rendered conducting when a timing function is cancelled.

10. The invention defined in claim 1, wherein:

said electric power source is an alternating current source;

said semiconductor switching means comprises a semiconductor controlled rectifier;

and said solid-state means includes a rectifier bridge connected between said source and said semiconductor controlled rectifier.

11. The invention defined in claim 1, wherein:

said semiconductor switching means comprises a power transistor;

said solid-state means includes a rectifier bridge connected between said source and said power transistor;

and said system may be powered by either a DC or AC source.

12. The invention defined in claim 1, wherein said semiconductor switching means comprises:

two semiconductor controlled rectifiers in series connection;

said means operable by said on-off switch for controlling said semiconductor switching means thereby to energize said load comprising means operable when said on-off switch is closed for rendering both of said controlled rectifiers conducting and comprising:

means responsive to reapplication of power to the system following power interruption while the load is energized for rendering both of said controlled rectifiers conducting thereby to reenergize the load;

and means effective when power to the system is reapplied following power interruption while the load is not energized and said on-off switch is open for preventing firing of one of said controlled rectifiers thereby to maintain the load deenergized.

13. In an off-delay solid state timer system the combination comprising:

an alternating current source;

a load adapted to be energized from said source;

power switching means for completing the circuit from said source to said load and comprising a pair of semiconductor controlled rectifiers in series connection;

a rectifier bridge supplied from said source for supplying full-wave rectified anode voltage to one of said controlled rectifiers;

means comprising a rectifier supplied from said source for providing a filtered DC supply;

means normally applying a firing signal to said one controlled rectifier;

a timing circuit energized from said DC supply; and for completing the firing circuit to the gate of the other controlled rectifier;

means supplying anode voltage to said other controlled rectifier from said DC supply;

means responsive to closure of said on-off switch for providing a firing signal to other said controlled rectifier to energize the load;

said system being operative under said load energized condition if power is interrupted and comes back on for firing both of said controlled rectifiers to reenergize the load;

means responsive to opening of said on-off switch for initiating operation of said timing circuit;

and means responsive to timeout of said timing circuit for shunting the firing signal from said one controlled rectifier to deenergize the load; and said system being operative under either said timing condition or said load deenergized condition if the power is interrupted and comes back on for preventing refiring of said other controlled rectifier thereby to maintain the load deenergized.

* * * * *

PO-1050
(5/69)

UNITED STATES PATENT OFFICE
CERTIFICATE OF CORRECTION

Patent No. 3,641,397 Dated February 8, 1972

Inventor(s) William H. Elliot and Isadore Small III

It is certified that error appears in the above-identified patent and that said Letters Patent are hereby corrected as shown below:

Column 6, line 32 reads: "invention as defined" and should read --invention defined--

Column 8, lines 23-25 omit "and for completing the firing circuit to the gate of the other controlled rectifier;"

Column 8, after line 25 insert the subparagraph --an on-off switch for shunting said timing circuit and for completing the firing circuit to the gate of the other controlled rectifier;--

Column 8, line 29 reads: "other said" and should read: --said other--

Signed and sealed this 4th day of July 1972.

(SEAL)
Attest:

EDWARD M. FLETCHER, JR.
Attesting Officer

ROBERT GOTTSCHALK
Commissioner of Patents